Patented Dec. 29, 1936

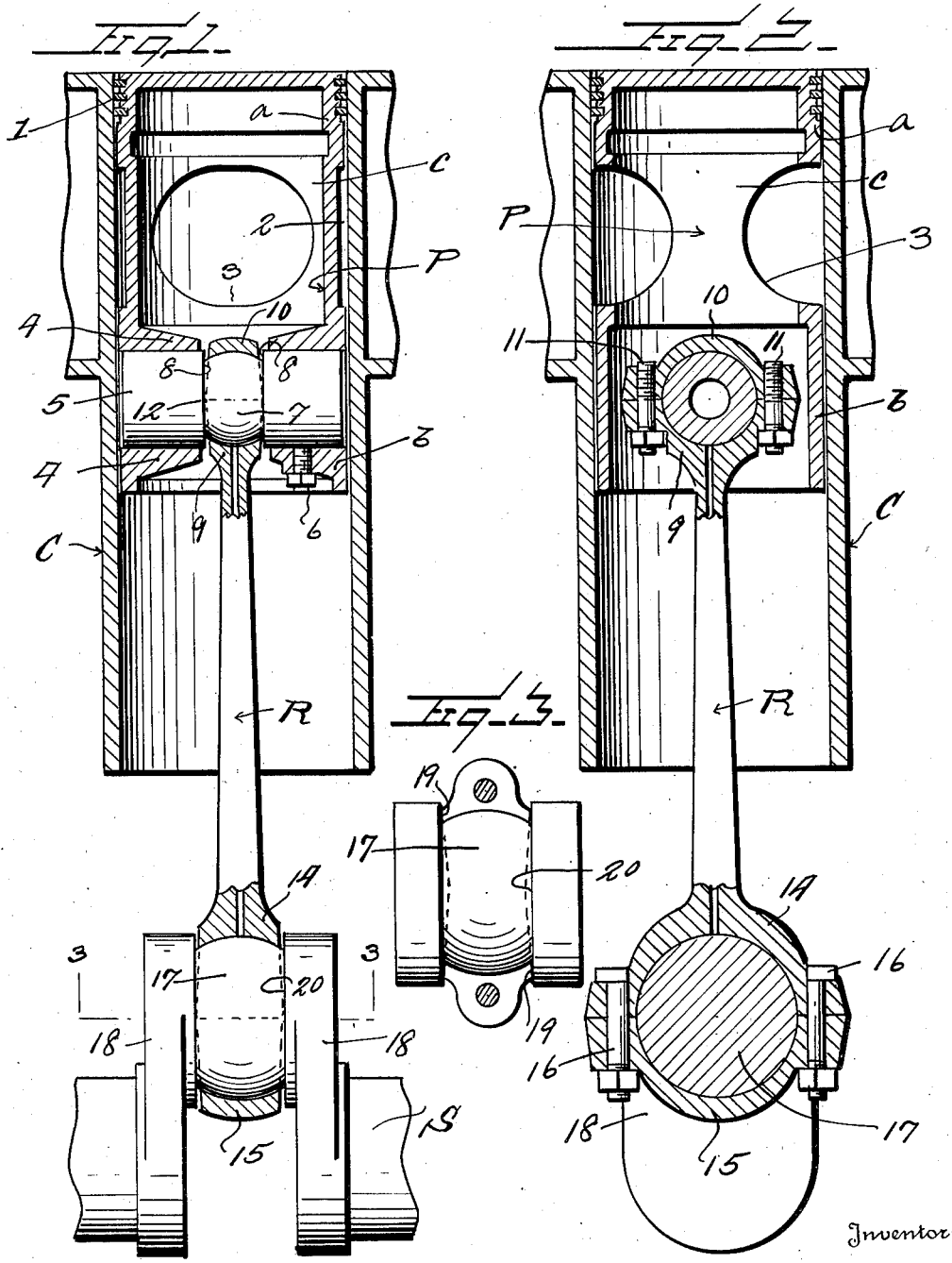

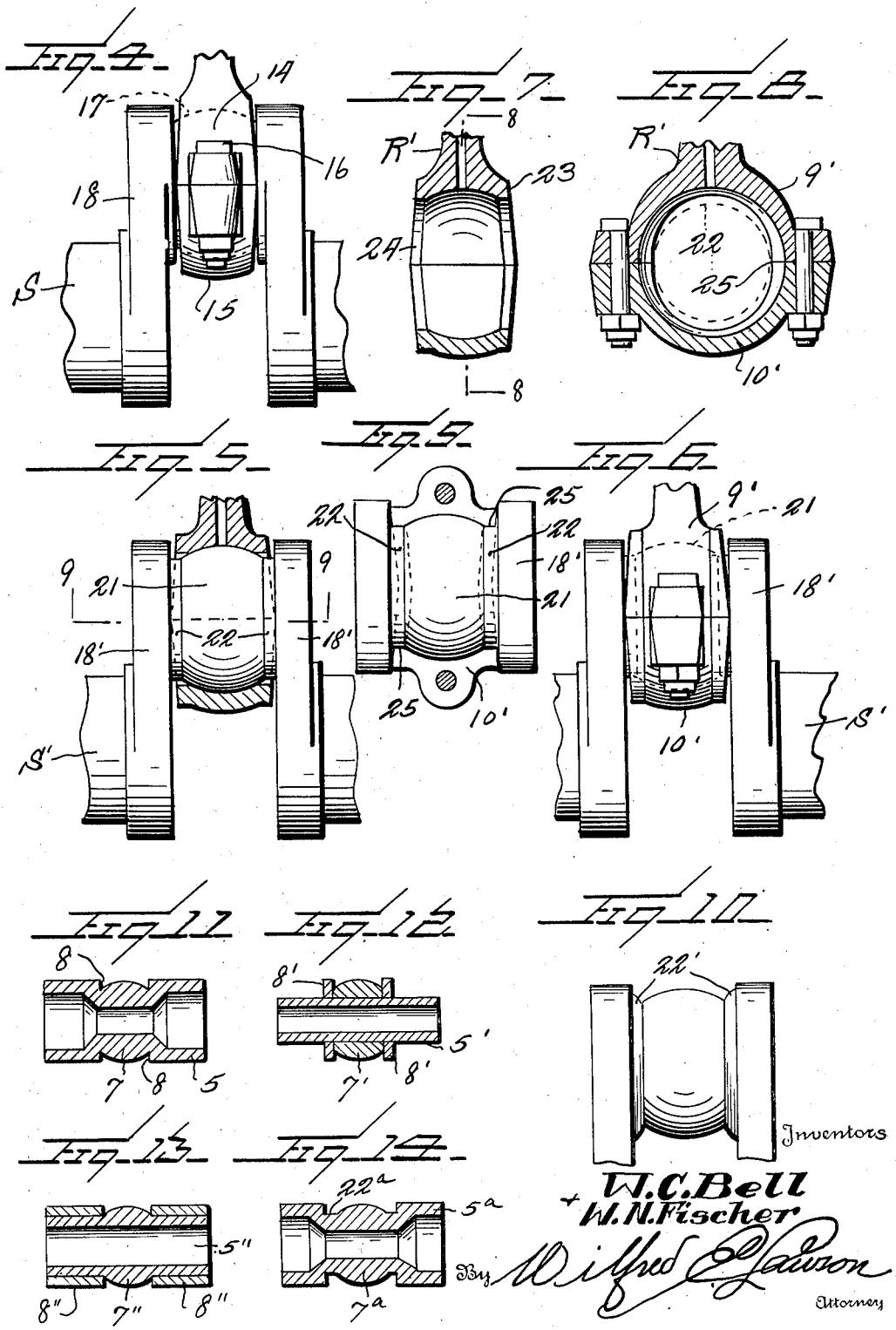

2,065,509

UNITED STATES PATENT OFFICE 2,065,509

PISTON AND CONNECTING ROD CONSTRUCTION

William Crawford Bell, Baltimore, and William Nicholas Fischer, Baltimore County, Md.

Application October 23, 1934, Serial No. 749,652

9 Claims. (Cl. 74—579)

This invention relates to certain improvements in internal combustion engines and has relation more particularly to an engine of this type embodying a reciprocating piston and a crank shaft operatively connected by a rod, and it is an object of the invention to provide means to resist tendencies of the bearings of the connecting rod to shift resulting in the misalignment of the piston with relation to its cylinder.

It is also an object of the invention to provide means for operatively connecting the rod with the piston and crank in a manner to effect automatically free floating self-alignment of the piston within its cylinder and whereby leverage stresses are eliminated with of course the resultant undue wear.

The invention also has for an object to provide a piston and connecting rod construction which permits proper alignment of the piston with the cylinder regardless of slight misalignment of the cylinder with the crank which is connected to the piston within the cylinder by the connecting rod.

An additional object of the invention is to provide a piston and connecting rod construction wherein the parts are so assembled to assure the connection between the rod and piston at no time coming within the path of travel of the compression ring or rings at the firing end portion of the piston so that a material reduction is effected in deterioration of wear of the cylinder as the sideward thrusts generated in the transformation of the reciprocating motion into rotary motion occur beyond the field of travel of the compression rings.

A still further object of the invention is to provide a piston and connecting rod construction wherein the connection between the rod and the piston and crank is such to eliminate at all times during the operation of the motor all relative rotary motion between the rod and the piston.

A still further object of the invention is to provide a piston and connecting rod construction embodying a mount in which the wrist pin of the piston comprises a ball with which engages a socket carried by the rod, the assembly of the ball and socket being such to permit of the free swinging of the connecting rod with respect to the piston in the direction of the turning of the crank shaft but which will prevent relative turning of the piston and the rod whereby is assured a free floating piston.

The invention consists in the details of construction and in the combination and arrangement of the several parts of our improved piston and connecting rod construction whereby certain important advantages are attained and the device rendered simpler, less expensive and otherwise more convenient and advantageous for use, as will be hereinafter more fully set forth.

The novel features of our invention will hereinafter be definitely claimed.

In order that our invention may be the better understood, we will now proceed to describe the same with reference to the accompanying drawings, wherein:—

Figure 1 is a view partly in section and partly in elevation and of somewhat a diagrammatic character of a piston and connecting rod construction embodying our invention, the head of the cylinder block being omitted;

Figure 2 is a view somewhat similar to Figure 1 with the line of section at right angles to the line of section of Figure 1;

Figure 3 is a view partly in top plan and partly in section illustrating the crank and bearing cap as comprised in Figure 1, the section being on the line 3—3 of Figure 1;

Figure 4 is a fragmentary view in side elevation of the crank end portion of the structure as illustrated in Figure 1;

Figure 5 is a view partly in section and partly in elevation illustrating a construction in accordance with another embodiment of our invention;

Figure 6 is a view in side elevation of the structure as illustrated in Figure 5;

Figure 7 is a sectional view taken through the assembled bearing as illustrated in Figure 5, the line of section being in a direction lengthwise of the crank shaft;

Figure 8 is a sectional view taken substantially on the line 8—8 of Figure 7 with a spherical member or enlargement being indicated by broken lines;

Figure 9 is a view partly in top plan and partly in section of the structure as illustrated in Figure 5, the section being substantially on the line 9—9 of Figure 5;

Figure 10 is a fragmentary elevational view illustrating another embodiment of the invention;

Figure 11 is a longitudinal sectional view taken through the type of wrist pin for the piston as disclosed in Figures 1 and 2;

Figure 12 is a longitudinal sectional view illustrating a wrist pin constructed in accordance with another embodiment of our invention;

Figure 13 is a longitudinal sectional view of a further type of wrist pin;

Figure 14 is a longitudinal sectional view of a still further form of wrist pin;

As disclosed in the accompanying drawings, C denotes a cylinder in which the piston P has reciprocating movement. In Figures 1 and 2 of the drawings the piston is at the limit of its compression stroke and it is to be noted that the cylinder head has been omitted. The inner or compression end portion $a$ of the piston is surrounded in a well known way by the usual compression rings 1 while the opposite or outer end portion $b$ of the piston constitutes what may be termed a guide section or skirt. The intermediate portion $c$ of the piston, which integrally connects the sections $a$ and $b$, is of a major diameter less than the corresponding diameters of the adjacent sections $a$ and $b$ whereby is provided a surrounding annular channel 2 to facilitate lubrication.

The piston P is of a hollow type and the intermediate portion $c$ is provided in its wall with relatively large openings 3, preferably diametrically opposed, which permit lubricant as splashed up within the piston P to be effectively delivered to the wall of the cylinder.

The guide or skirt section is provided with a conventional type of inwardly disposed and aligned bosses 4 to provide mountings for the opposite end portions of a wrist pin 5. This pin is preferably rigidly held in position in any suitable manner which, as herein disclosed, comprises a binding screw 6 threaded through the wall of one of the bosses 4 and engaging an end portion of the pin 5. This securing means or element 6 particularly serves to hold the applied pin 5 against endwise movement in order to maintain the intermediate parti-spherical portion 7 of the pin 5 at the axial center of the piston P and between the inner ends of the bosses 4. It is to be stated at this time that the diameters of the end portions of the pin 5, and which portions are preferably cylindrical, are not less than the maximum diameter of the spherical portion 7 so that no hindrance or obstruction will be offered to the ready placement of the pin 5.

The formation of the spherical portion 7 is such to provide at opposite sides of such portion 7 the opposed annular contact surfaces or shoulders 8 which are concentric to the axial center of the pin 5 or more particularly to the center line of the spherical portion 7 disposed lengthwise of the pin 5.

The connecting rod R is provided at one end portion with a parti-spherical socket member 9 which is effectively held to the parti-spherical portion or section 7 of the pin 5 by the parti-spherical socket cap 10. The cap 10 is held in applied position in any desired manner but, as herein disclosed, such connection is accomplished in a conventional manner by the studs 11. The complete socket as provided by the section 9 and applied cap 10 is of a length in a plane intersecting its axis and in a direction transversely of the rod R substantially equal to the distance between the annular surfaces or shoulders 8 at the opposite sides of the parti-spherical portion or section 7 of the pin 5. From this plane in opposite directions therefrom the length of the socket is reduced preferably on a taper as is clearly illustrated by broken lines in the accompanying drawings. This particular formation of the socket provides restricted high points 12 which are substantially knife edges. The contact of these points 12 with the surfaces or shoulders 8 holds the piston P against rotary movement yet in no way hindering or obstructing the desired reciprocatory movement of the piston or the slight lateral movement of the connecting rod to maintain the desired alignment.

The wrist pin 5 is tubular and, as illustrated in Figures 1 and 11, such pin 5 is an integral structure. If preferred, however, a parti-spherical section or member 7' may be welded or otherwise fixed to the medial portion of a straight pin 5' with disks or plates 8' welded or otherwise secured to the pin 5' at opposite sides of the member 7' to provide the desired annular shoulders or surfaces.

As illustrated in Figure 13, the parti-spherical portion 7'' may be integrally formed with the central portion of the pin 5'' with sleeves 8'' fixed around the end portions of the pin 5'' and terminating immediately adjacent to the parti-spherical portion or section 7'' whereby the desired annular surfaces or shoulders are obtained.

The outer end of the rod R carries a parti-spherical socket section 14 with which is associated a parti-spherical cap 15 secured thereto, as at 16, in a conventional manner, said socket member 14 and cap 15 co-operating to provide a parti-spherical socket which snugly receives a parti-spherical section or portion 17 carried by the pin connecting the outer portions of the arms 18 of a double crank interposed within the drive shaft S. The section 14 and cap 15 of the socket are of substantially the same formation as the socket at the opposite end of the connecting rod, that is to say, the socket as afforded by the section 14 and cap 15 is of a length in a plane intersecting the axis of such socket and in a direction lengthwise of the shaft S to provide restricted or knife edge portions 19 for contact with annular surfaces 20 surrounding the section 17. At opposite sides of these high portions 19 the length of the socket gradually decreases as is believed to be clearly indicated by the broken lines in Figures 1 and 3 and also to be clearly disclosed in Figure 4. This particular formation of the socket as comprised in the section 14 and cap 15 effectively serves to prevent turning movement of the rod R about its longitudinal axis yet no hindrance or obstruction is offered to the normal functioning of the rod R.

The cylinder C is of a length not less than the sum of the full length of the piston and piston stroke and the mounting of the pin 5 with respect to the throw of the crank is such that at no time does the compression of the piston as determined by the rings 1 come within the path of travel of the axial center of the pin 5 during the reciprocation of the piston. This is of importance as the usual lateral thrust of the piston incident to the oblique angular inclination of the rod R at certain stages of the piston stroke and against the wall of the cylinder C will be at an area other than that traversed by the compression rings 1. This, as is believed to be obvious, will materially increase the efficiency of the motor.

In the embodiment of the invention as particularly illustrated in Figures 5 to 9, the medial portion of the crank is provided with a parti-spherical portion or section 21 and between such portion or section 21 and the arms 18' of the crank are the annular or ring-like extensions 22 concentric to the axis of the portion or section 21 in a direction lengthwise of the shaft S'. This parti-spherical portion or section 21 is snugly engaged by the parti-spherical socket carried by an end portion of the connecting rod R', said socket comprising the socket section 9' formed with the rod R' and a separable cap 10'. The opposite sides of the parti-spherical socket is continued by the extended portions or lips 23 defining supplemental bearing openings or orifices 24. These secondary bearing openings or orifices in a plane of the axis of the socket and in a direction at right angles to the rod R' are of a diameter substantially equal to the diameter of the extensions 22 for contact therewith at all times at diametrically opposed points as indicated at 25 in the drawings. The diameter of each of these openings or orifices 24 in a direction lengthwise of the rod R' is greater whereby the construction of the socket member is such to effectively coact with the surfaces 22 in a manner to prevent axial rotation of the rod R'.

This same arrangement can be employed in connection with the wrist pin of the piston and, as illustrated in Figure 14 of the drawings, the pin 5a at opposite sides of the parti-spherical portion 7a is provided therearound with the annular or ring-like surfaces 22a.

In the embodiment of the invention as illustrated in Figure 10, instead of the peripheries of the surfaces 22' being straight in cross section as the surfaces 22, said surfaces 22' are conoidal. To most effectively obtain the result desired it is found best to provide the rod connections at both ends so that the crank shaft may serve as an anchorage for the connecting rod in all of its movements so that the mountings of the rod are with a crank and with the pin of a piston to most effectively hold the piston against rotation.

From the foregoing description it is thought to be obvious that a piston and connecting rod construction constructed in accordance with our invention is particularly well adapted for use by reason of the convenience and facility with which it may be assembled and operated, and it will also be obvious that our invention is susceptible of some change and modification without departing from the principles and spirit thereof and for this reason we do not wish to be understood as limiting ourselves to the precise arrangement and formation of the several parts herein shown in carrying out our invention in practice except as hereinafter claimed.

We claim:—

1. In a piston and connecting rod construction, a member having a parti-spherical portion and contacting surfaces surrounding the member at opposite ends of the parti-spherical portion, a connecting rod having a parti-spherical socket engaged with the parti-spherical portion of the member, said socket member having diametrically opposed enlarged portions substantially constantly in contact with the contacting surfaces to provide means for holding the rod and the member against relative rotation in a direction about the longitudinal axis of the rod.

2. In a piston and connecting rod construction, a member having a parti-spherical portion and contacting surfaces surrounding the member at opposite ends of the parti-spherical portion, a connecting rod having a parti-spherical socket engaged with the parti-spherical portion of the member, said socket member at each end being provided with complementary formed projections, the projections at each end being two in number and substantially in radial alignment, said projections having engagement with the contacting surfaces to provide means to allow of free angular adjustment of the member and socket one with respect to the other and simultaneously to prevent axial rotary movement of the connecting rod with respect to the member in a plane at right angles to the length of the rod.

3. In a piston and connecting rod construction, a member having a parti-spherical portion and contacting surfaces at opposite ends of the parti-spherical portion, said surfaces being concentric to the axis of the member and substantially at right angles to such axis, a connecting rod having a parti-spherical socket engaged with the parti-spherical portion of the member, said socket being of a length in the plane of the axis thereof and transversely of the connecting rod and at opposite sides of the axis of the member substantially equal to the distance between the contacting surfaces, said socket at opposite sides of such plane decreasing in length to provide restricted portions at such plane for substantially constant contact at all times with the surfaces.

4. In a connecting rod construction, a member having a parti-spherical portion and a pair of annular shoulders one on each side of the parti-spherical portion, and a socket engaging the parti-spherical portion, said socket at opposite ends thereof having inclined faces converging to diametrically opposed points, the convergent points of the socket faces engaging the adjacent shoulders to hold the socket against endwise movement.

5. In a piston and connecting rod construction, a wrist pin having an intermediate parti-spherical portion and provided with a pair of annular shoulders one on each side of said intermediate portion, a socket carried by an end of said connecting rod and means carried by the socket and engageable with the shoulders to hold the piston against rotation about an axis coplanar with the longitudinal axis of the connecting rod, said means having a configuration such as to permit angular adjustment of the connecting rod relative to the piston while simultaneously holding the piston against rotation.

6. A connecting rod comprising a member having sockets at each end thereof, at least one of said sockets having concave interior surfaces for engagement with a parti-spherical bearing surface, said one socket including opposed enlargements at opposite ends thereof for engagement with opposed shoulders to hold the rod and the bearing surface against rotary movement about the longitudinal axis of the rod.

7. A connecting rod comprising a member having sockets at each end thereof, at least one of said sockets having concave interior surfaces for engagement with a parti-spherical bearing surface, said socket at opposite ends thereof having inclined faces converging to diametrically opposed points, the convergent points of the socket faces being engageable with opposed shoulders to hold the rod and the bearing surface against rotary movement about the longitudinal axis of the rod.

8. A connecting rod comprising a member having sockets at each end thereof, at least one of said sockets having concave interior surfaces for engagement with a parti-spherical bearing surface and also having substantially cylindrical surfaces on opposite sides of the concave interior surfaces, said one socket including opposed enlargements at opposite ends thereof for engagement with opposed shoulders to hold the rod against rotary movement about the longitudinal axis thereof.

9. In a piston and connecting rod construction, a wrist pin having an intermediate parti-spherical portion and provided with a pair of annular shoulders one on each side of said intermediate portion, said wrist pin also having cylindrical portions intermediate each shoulder and the adjacent side of the parti-spherical portion, a socket carried by an end of said connecting rod and provided with a concave interior bearing surface for engagement with the parti-spherical portion of the wrist pin, said socket also having substantially cylindrical bearing surfaces adjacent each end thereof and on opposite sides of the concave bearing surface, and means carried by the opposite ends of the socket and engageable with the shoulders to hold the piston against rotation about an axis coplanar with the longitudinal axis of the connecting rod, said means having a configuration such as to permit angular adjustment of the connecting rod relative to the piston while simultaneously holding the piston against rotation.

WILLIAM CRAWFORD BELL.
WILLIAM NICHOLAS FISCHER.